US008502139B2

(12) United States Patent
Yavor

(10) Patent No.: US 8,502,139 B2
(45) Date of Patent: Aug. 6, 2013

(54) MASS ANALYSIS DEVICE WITH WIDE ANGULAR ACCEPTANCE INCLUDING A REFLECTRON

(75) Inventor: Mikhail Yavor, Saint-Petersbourg (RU)

(73) Assignee: Cameca, Genevilliers (FR)

( * ) Notice: Subject to any disclaimer, the term of this patent is extended or adjusted under 35 U.S.C. 154(b) by 172 days.

(21) Appl. No.: 13/201,323

(22) PCT Filed: Feb. 12, 2010

(86) PCT No.: PCT/EP2010/051764
§ 371 (c)(1),
(2), (4) Date: Aug. 12, 2011

(87) PCT Pub. No.: WO2010/092141
PCT Pub. Date: Aug. 19, 2010

(65) Prior Publication Data

US 2011/0303841 A1 Dec. 15, 2011

(30) Foreign Application Priority Data

Feb. 13, 2009 (FR) ..................................... 09 50955

(51) Int. Cl.
*H01J 49/40* (2006.01)
*H01J 49/26* (2006.01)
*B01D 59/44* (2006.01)

(52) U.S. Cl.
USPC ........... 250/287; 250/281; 250/282; 250/283; 250/396 R; 250/397

(58) Field of Classification Search
USPC ................................. 250/281, 287, 288, 282
See application file for complete search history.

(56) References Cited

U.S. PATENT DOCUMENTS

| | | | | |
|---|---|---|---|---|
| 6,518,569 | B1 * | 2/2003 | Zhang et al. | 250/287 |
| 6,841,773 | B2 * | 1/2005 | McLoughlin et al. | 250/281 |
| 6,858,839 | B1 * | 2/2005 | Anderson et al. | 250/281 |
| 7,087,897 | B2 * | 8/2006 | Bateman et al. | 250/287 |
| 7,381,945 | B2 * | 6/2008 | Cotter et al. | 250/287 |
| 2003/0071208 | A1 * | 4/2003 | Hansen | 250/287 |
| 2004/0021069 | A1 * | 2/2004 | Barnard | 250/288 |
| 2004/0232327 | A1 * | 11/2004 | Bateman et al. | 250/288 |
| 2005/0230613 | A1 * | 10/2005 | Cotter et al. | 250/287 |
| 2005/0263694 | A1 * | 12/2005 | Hayek | 250/287 |

FOREIGN PATENT DOCUMENTS

| | | |
|---|---|---|
| WO | 2006/120148 A2 | 11/2006 |
| WO | 2006/134380 A2 | 12/2006 |

OTHER PUBLICATIONS

Sarrau J. M. et al.: "The Rouen energy-compensated atom probe," Applied Surface Science, Elsevier, Amsterdam, NL, vol. 76-77, Mar. 2, 1994, pp. 367-373.

Andren H. O.: "Performance of an energy compensator with a large acceptance angle," Journal De Physique Colloque France, vol. 47, No. C-7, Nov. 1986, pp. 483-488.

* cited by examiner

*Primary Examiner* — Nikita Wells
*Assistant Examiner* — Johnnie L Smith
(74) *Attorney, Agent, or Firm* — Baker & Hostetler LLP

(57) ABSTRACT

A mass analysis device with wide angular acceptance, notably of the mass spectrometer or atom probe microscope type, includes means for receiving a sample, means for extracting ions from the surface of the sample, and a reflectron producing a torroidal electrostatic field whose equipotential lines are defined by a first curvature in a first direction and a first center of curvature, and a second curvature in a second direction perpendicular to the first direction and a second center of curvature, the sample being positioned close to the first center of curvature.

14 Claims, 2 Drawing Sheets

MASS ANALYSIS DEVICE WITH WIDE ANGULAR ACCEPTANCE INCLUDING A REFLECTRON

CROSS-REFERENCE TO RELATED APPLICATIONS

This application is a National Stage of International patent application PCT/EP2010/051764, filed on Feb. 12, 2010, which claims priority to foreign French patent application No. FR 09 50955, filed on Feb. 13, 2009, the disclosures of which are incorporated by reference in their entirety.

FIELD OF THE INVENTION

The present invention relates to a mass analysis device with wide angular acceptance including a reflectron. Hereinafter, the term angular acceptance should be understood to mean the capacity for the device incorporating the reflectron to process ions emitted from a source such as the surface of a sample to be analyzed, with a wide angular dispersion.

The present invention applies notably to the field of time-of-flight spectrometry, and more particularly to the mass analysis devices such as mass spectrometers and time-of-flight atom probes equipped with electrostatic mirrors, or reflectrons.

BACKGROUND OF THE INVENTION

A time-of-flight or TOF mass spectrometer can be used to determine the mass of ions torn from a sample by measuring the time of flight of the ions from a determined position, real or virtual, of the ion source, to their impact on a detector, through an analysis chamber. The time of flight of an ion through an electrostatic field is proportional to the square root of the mass-to-charge ratio of this ion for a given kinetic energy. The mass resolution of a time-of-flight spectrometer depends, in addition to the accuracy with which the instants of departure and of impact of the ions can be measured, on the energy dispersion of the ions; as it happens, ions with the same mass-to-charge ratio but with different energy-to-charge ratios exhibit different times of flight from the ion source to the detector.

One known method that can be used to eliminate, at least as a first approximation, the dependency of the time of flight of an ion on its energy, and thus enhance the mass resolution of a time-of-flight spectrometer, is to incorporate in the analysis chamber of the mass spectrometer a device of ion mirror type. This method was proposed for the first time by Alikhanov, and implemented by Mamyrin. Reference can be made to the corresponding respective articles: Alikhanov, Soviet Physics Journal of Experimental and Theoretical Physics (JETP), 4 (1956) 452 and Mamyrin et al., Soviet Phys. JETP, 37 (1973) 45.

The ions with the greatest energy penetrate more deeply into the electrostatic field generated by the ion mirror, the path that they travel and their time of flight in the analysis chamber are thus longer than for the ions with weaker energy. Consequently, the extension of the time of flight of the ions with the greatest energy compared to the ions with the least energy within the electrostatic field generated by the ion mirror compensates for the fact that the time of flight is shorter for the ions with the greatest energy, in the area of the analysis chamber located outside the field generated by the mirror. Thus, the total time of flight within the analysis chamber is made independent of the energy of the ions. The mass analyzers—that is to say notably the mass spectrometers and atom probes—equipped with electrostatic mirrors are commonly referred to as reflectron mass analyzers.

The ion mirrors used in the reflectron time-of-flight mass analyzers typically incorporate delaying electrostatic fields that are uniform or uniform piecewise, that is to say uniform in determined spatial regions. The ion mirrors commonly consist of a main electrode, of a particular geometry and excited by an electrical potential, and a gate electrode of a similar geometry and excited by a different electrical potential. The electrostatic field generated by these electrodes is contained in the space separating these electrodes, and its characteristics can, for example, be adjusted according to the excitation potentials.

Different types of mass spectrometers rely on varying ion emission methods such as field desorption, laser desorption or secondary ion emission, which are in themselves known from the state of the art. One characteristic of the ion beams resulting from these techniques is a strong angular dispersion of the emitted ions, that can have values as high as around 90° or more. It is important not to restrict ion beams with wide angular dispersion, in order to maximize the sensitivity of the mass spectrometer. Furthermore, the analysis of ions emitted with a wide angular dispersion can also be of major interest, in certain applications such as, for example, atom probes, also called atom probe microscopes, in which an increase in the angular acceptance is synonymous with a widening of the field of vision of the microscope, given that different emission angles correspond to different positions on the surface of the sample from which the ions are torn.

It should be noted that all the ion emission methods, and more particularly field desorption, are characterized by significant energy dispersions; it is thus particularly indicated to use ion mirrors in order to improve the performance levels of the time-of-flight mass analysis devices.

The ion mirrors of the conventional reflectrons with piecewise uniform electrostatic field cannot accept an angular dispersion of the ion beam greater than approximately 10°. In order to make it possible to record the ion signals with detectors of reasonable dimensions, while accepting strong angular dispersions, mirrors with curved geometry were proposed in the article by Vialle et al., Rev. Sci. Instrum., 68 (1997) 2312. A reflectron with curved geometry is proposed in the international patent application WO2006/120428. This type of reflectron produces a transformation of the ion beam diverging from a sample of small size into a substantially parallel beam which can be admitted by a detector of reasonable dimensions. The plane of the detector is substantially perpendicular to the ion beam, in order to avoid increasing the dimensions of the detector, which would otherwise be unavoidable. In addition to its spatial focusing properties, and the focusing in terms of time of flight as a function of the energy of the ions, such a device has spatial focusing properties as a function of the energy of the ions, and can thus be used to obtain images of a sample that are spatially resolved, in atom probe microscopes.

Such a reflectron does, however, have some drawbacks. On the one hand, the angular acceptance of such a device cannot exceed 90° for reasons simply linked to the geometry of the device. The angular acceptance of such a reflectron is also reduced by an essential inclination relative to the plane of the detector, of the surface on which the focus in terms of time of flight as a function of energy is produced. Another drawback with this type of reflectron is linked to the fact that the intersection between most of the trajectories of the ions and the direction normal to the input gate electrode of the reflectron mirror is produced according to fairly open angles, which considerably increases the dispersion of the ions at the level of the local electrical field non-uniformities generated by the gate.

To sum up, the use of curved field mirrors improves the angular acceptance with mass spectrometers or reflectron atom probe microscopes. However, the reflectrons known from the state of the art do not give these devices a sufficient angular acceptance, and offer a certain number of other drawbacks.

SUMMARY OF THE INVENTION

One aim of the present invention is to overcome at least the abovementioned drawbacks, by proposing a novel reflectron design, capable of allowing a wide angular acceptance of the ions emitted from the small surface of a sample in at least one direction.

To this end, the subject of the invention is a time-of-flight mass analysis device, notably of mass spectrometer or atom probe type, characterized in that it comprises:

- means for receiving a sample,
- means for extracting ions from the surface of the sample,
- a detector,
- an ion mirror producing an electrostatic field with toroidal geometry whose equipotential lines are defined by a first curvature in a first direction contained in the radial plane of the mass analysis device and a first center of curvature, and a second curvature in a second direction perpendicular to the first direction in the transverse plane of the mass analysis device and a second center of curvature, the sample being positioned at a distance from the first center of curvature less than a quarter of the first radius of curvature.

According to one embodiment of the invention, the time-of-flight mass analysis device may be characterized in that the detector is positioned at a distance from the spatial focal point of the ions emitted from the sample in the first direction, after reflection by the ion mirror, less than a quarter of the first radius of curvature.

In one embodiment of the invention, the time-of-flight mass analysis device may be characterized in that the detector is positioned downstream of the spatial focal point of the ions emitted from the sample in the first direction, after reflection by the ion mirror.

In one embodiment of the invention, the time-of-flight mass analysis device may be characterized in that the detector is sensitive to the two-dimensional position of the impact of the ions on its surface.

In one embodiment of the invention, the time-of-flight mass analysis device may be characterized in that the detector can be displaced along the main axis of the mass analysis device.

In one embodiment of the invention, the time-of-flight mass analysis device may be characterized in that the ion mirror comprises a rear electrode and a gate electrode, the electrostatic field being formed between the rear electrode and the gate electrode.

In one embodiment of the invention, the time-of-flight mass analysis device may be characterized in that the rear electrode and the gate electrode have a cylindrical surface.

In one embodiment of the invention, the time-of-flight mass analysis device may be characterized in that the rear electrode and the gate electrode have a spherical surface.

In one embodiment of the invention, the time-of-flight mass analysis device may be characterized in that it comprises additional means that can vary the electrostatic field produced by the ion mirror.

In one embodiment of the invention, the time-of-flight mass analysis device may be characterized in that the sample can be displaced in all directions, and/or be pivoted.

In one embodiment of the invention, the time-of-flight mass analysis device may be characterized in that the ion extraction means tear the ions from the surface of the sample by field desorption and/or laser desorption, or secondary ion emission.

According to the present invention, a particular reflectron time-of-flight mass analyzer geometry is proposed for this purpose. According to this geometry, the sample to be analyzed is placed at a distance substantially close to the center of curvature of the curved field mirror in the direction of the emitted ion field. The emitted ions, after reflection on the curved field mirror, are then focused in the direction concerned, at a conjugate point situated at a position opposite, relative to the center of curvature, the position of the sample. The detector may be positioned, depending on the physical problem to be solved, either at the focus point or else downstream of this point. In the first case, the offset from the position of the detector, of the focus points in terms of time of flight as a function of the energy of the ions for all the ion emission directions, is minimal. In the latter case, the angular image of the sample may be resolved on a detector of reasonable dimensions.

One advantage of the present invention lies in the fact that these properties remain valid for a theoretically unlimited angular dispersion, in other words up to 180°.

Another advantage of the invention lies in the fact that, independently of the angular dispersion, the angles of intersection of the ion trajectories relative to the normal to the surface of the input gate electrode of the mirror for the direction concerned, remain small, thus allowing for a reduction in the angular dispersion of the ions at this level.

The spatial dispersion in energy offered by the reflectron time-of-flight mass analyzer according to the invention is not zero at the level of the detector. However, by using the field of a spherical mirror and a small offset between the sample and the center of curvature of the field, this dispersion can be made negligible and tend toward zero. This is due to the fact that in the case—which is unfeasible in practice—in which the position of the sample coincides with the center of curvature of the field, ions follow the same trajectories toward the mirror, then on return from the mirror, independently of their kinetic energy.

Thus, the particular configuration, specific to this invention, of a reflectron time-of-flight mass analyzer, including a spherical mirror field and a detector situated downstream of the focus point, confers properties that are particularly favorable to a wide angular acceptance of the ion beam, notably particularly suited to use in high resolution and high sensitivity atom probe microscopes.

BRIEF DESCRIPTION OF THE DRAWINGS

Other features and advantages of the invention will become apparent from reading the description, given as an example, in light of the appended drawings which represent.

DETAILED DESCRIPTION

Figure 1:
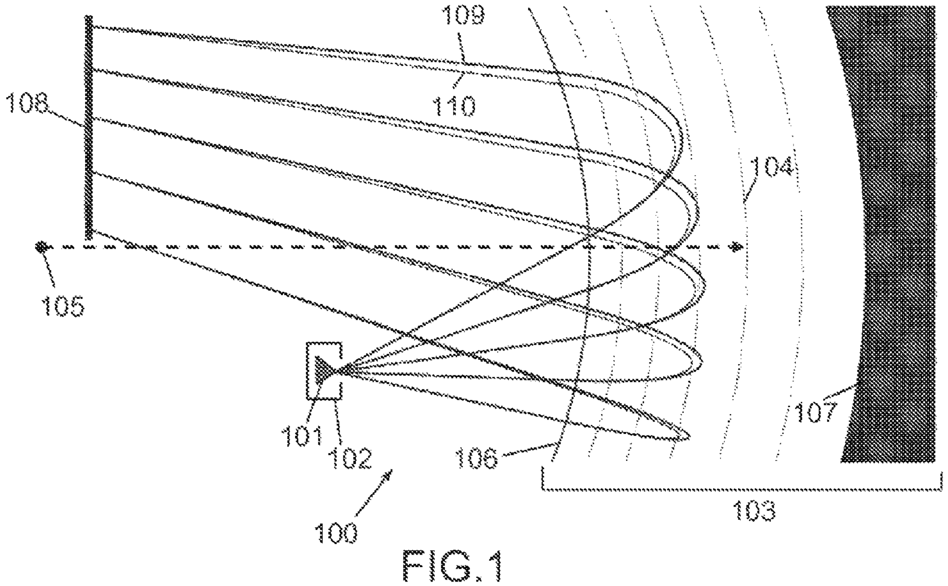
FIG. 1, the cross-sectional view in the radial plane of a mass analysis device of a reflectron geometry known from the state of the art.

FIG. 1 shows the cross-sectional view in the radial plane of a mass analysis device, of a reflectron geometry known from the state of the art, as presented in the abovementioned patent application WO2006/120148.

A mass analyzer 100 includes a sample 101 of small size, for example in the form of a point, from which ions are emitted and accelerated by extraction electrodes 102. The emitted ions follow, in the analysis chamber of the mass analyzer 100, trajectories 109 and 110. The ions are reflected in an ion mirror 103 forming an electrostatic field with curved equipotential surface 104. The equipotential lines have a center of curvature 104. The ion mirror 103 consists of a rear electrode 107 and a gate electrode 106. A detector 108 collects the ions.

The detector 108 is sensitive to the position of the point of impact of the ions on its surface. The center of curvature 105 of the equipotential lines of the field generated by the ion mirror 103 is typically situated at a greater distance from the mirror 103 than the sample 101.

The ion mirror 103 allows divergent ion trajectories originating from the sample 101 to become essentially less divergent, even slightly convergent after reflection. Thus, at a great distance from the mirror 103, the ion trajectories can equally be picked up by the detector 108 whose size can remain reasonable. This great spacing of the trajectories enables the ions to have a time of flight that is sufficient to give the mass analyzer 100 a high mass resolution. The intensity of the electrostatic field within the ion mirror 103, and therefore the length of the trajectories within the ion mirror 103, is chosen so that the ions emitted from the sample in the same direction, but with different energies, along the trajectories 109 and 110, reach the detector 108 essentially at the same moment; that is to say that the focus in terms of time of flight relative to the energy of the ions is assured.

The distance between the ion mirror 103 and the detector 108 is chosen such that the ions emitted from the sample in the same direction, but with different energies, reach the detector 108 essentially at the same point of impact; that is to say that the spatial focus relative to the energy of the ions is assured.

Thus, if different points of departure on the surface of the sample 101 correspond to different emission angles, as is the case, for example, in atom probe microscopes, an image of the sample can be resolved on the level of the detector, with a low chromatic aberration.

FIG. 1 clearly shows that the geometry of the mass analyzer 100 presented here does not make it possible to increase the angular acceptance beyond 90°. It also shows clearly that, for wide angular dispersions, most of the ions intersect with the gate electrode 106 of the ion mirror 103 at relatively great angles relative to the normal to the surface of the gate electrode 106. It is known to specialists in ion optical theory that such intersection angles lead to dispersion effects at the level of the local electrostatic field non-uniformities at the level of the gate electrode 106.

Figure 2:
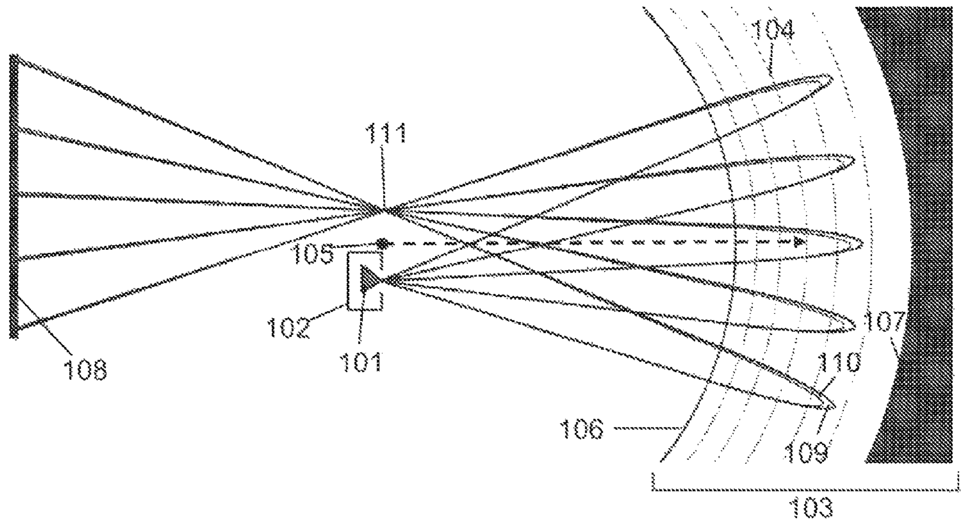
FIG. 2, the cross-sectional view in the radial plane of a mass analysis device, of an exemplary reflectron geometry according to one embodiment of the present invention.

FIG. 2 shows a cross-sectional view in the radial plane of a mass analysis device of an exemplary reflectron geometry according to one embodiment of the present invention.

The sample 101 is positioned close to the center of curvature 105 of the equipotential lines 104 of the electrostatic field generated by the ion mirror 103. In the example of the figure, the electrode 107 of the electrostatic mirror 103 has a spherical geometry, as does the gate electrode 106. Thus, the equipotential lines 104 of the electrostatic field have a spherical symmetry. In a manner similar to the description given above with reference to FIG. 1, the ions are emitted from the surface of the sample 101 and accelerated by the extraction electrodes 102, then reflected by the ion mirror 103. The ions pass through a point 111, conjugate with the point to which the sample 101 forming a point can be compared as a first approximation. Downstream of the point 111, the ions reach the detector 108, sensitive to the position of the points of impact with its surface.

The electrostatic field prevailing within the ion mirror 103, and therefore the length of the trajectories of the ions within the ion mirror 103, are chosen such that the ions emitted from the surface of the sample 101, in one and the same direction but with different energies, following trajectories 109 and 110, reach the detector 108 essentially at the same instant; that is to say that the focus in terms of time of flight relative to the energy of the ions is assured. The focus in terms of time of flight relative to the energy of the ions cannot strictly be produced at the level of the detector 108, given that the surface on which the condition of such a focus is satisfied is of substantially spherical form, with a center situated at the conjugate point 111. Nevertheless, this surface is substantially parallel to the central region of the surface of the detector 108, so the dependency of the time of flight of an ion on its energy remains low for a relatively great angular emission dispersion, this dependency increasing as the square of the distance separating the center of the detector 108 from the point of impact of the ion concerned on the surface of the detector 108.

Given that the sample 101 is close to the center of curvature 105 of the ion mirror 103, the angles formed between the trajectories of the ions and the lines normal to the surface of the gate electrode 106 of the ion mirror 103 at the points of intersection between the latter, are reduced. These angles tend toward zero when the sample 101 tends toward the center of curvature 105 of the ion mirror 103. In other words, the trajectories of the ions are substantially perpendicular to the surface of the gate electrode 106 of the ion mirror 103. This particular configuration makes it possible to reduce the effects of dispersion of the ions caused by the non-uniformities of the local electrostatic field close to the gate electrode 106.

In addition, the deviation between the trajectories 109 and 110, of ions departing from the surface of the sample 101 in one and the same direction but having different energies, remains small after reflection by the ion mirror 103; this deviation tends toward zero when the sample 101 tends toward the center of curvature 105 of the equipotential lines 104 of the electrostatic field produced by the ion mirror 103. Thus, although the coincidence, at the level of the detector 108, of the trajectories of the ions with the same initial direction but having different energies is not perfect, it does remain excellent if the energy dispersion of the ions remains relatively low. It can also be said that the spatial chromatic aberration remains low. This means that ions with different directions of emission can be resolved at the level of the detector 108 with a good accuracy.

In one embodiment of the invention, the radius of curvature of the rear electrode 107 may, for example, be equal to 400 mm, the distance from the sample 101 to the center of curvature 105 may be equal to 30 mm, and the distance from the detector 108 to the focus point 111 may be equal to 275 mm.

More generally, it is possible to chose to position the sample 101 at a distance from the center of curvature 105 less than a given percentage of the radius of curvature of the rear electrode 107, for example 25%.

Figure 3:
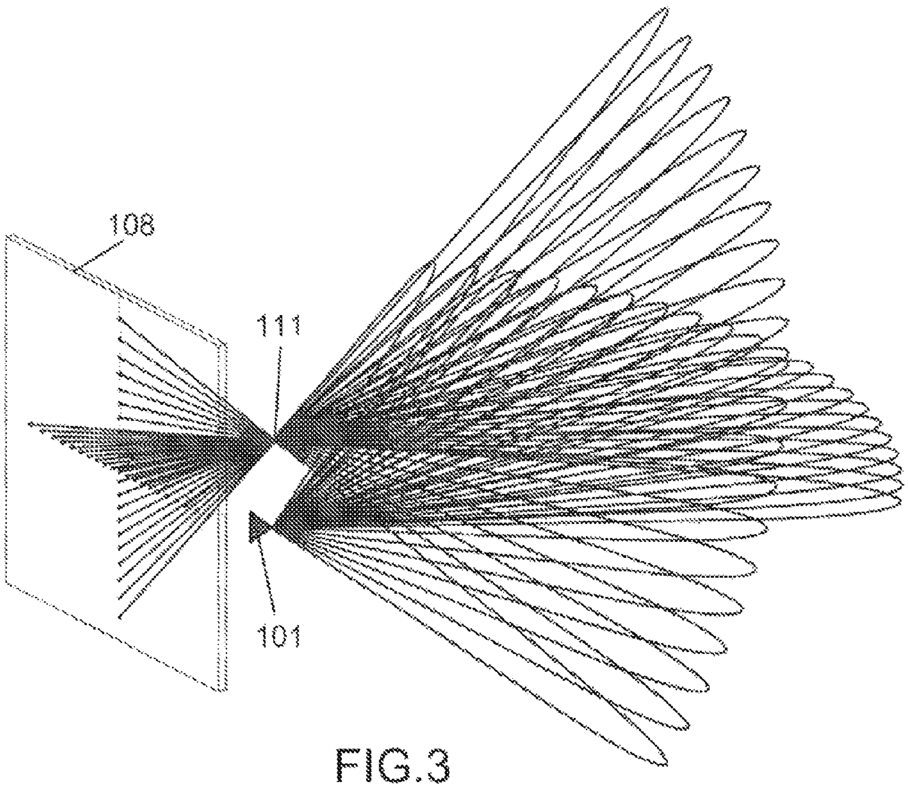
FIG. 3, the perspective view of an example of the image formed on a detector sensitive to position, of ions emitted from a sample in different directions in the radial plane and in the transverse plane, according to one embodiment of the present invention.

FIG. 3 shows the perspective view of an exemplary image formed on the level of a position-sensitive detector, of ions emitted from a sample in different directions in the radial plane and in the transverse plane, according to one embodiment of the present invention.

This embodiment of the invention can be used to analyze ions emitted from the surface of the sample 101 with a great angular dispersion, theoretically up to π radians, by using a detector 108 of finite size. The angular acceptance is all the greater when the center of the detector 108 is close to the point 111 conjugate with the point to which the sample 101 is compared.

In the particular case where the time-of-flight mass analyzer 100 is an atom probe, and therefore where different ion emission directions correspond to different points on the surface of the sample 101, this embodiment of the invention allows for a great mass resolution with a wide angular acceptance, and a good spatial resolution, by virtue of a low spatial chromatic aberration. In other words, this embodiment of the invention is particularly appropriate for an application of atom probe microscope type.

Because of the offset of the sample 101 relative to the axis in the radial plane, the focus in terms of aperture or energy can be produced differently in the radial plane and in the transverse plane. To overcome this problem, it may be advantageous to use an electrostatic mirror 103 which does not have a strictly spherical geometry. In such a configuration, the radius of curvature and therefore the center of curvature in the radial plane are different from the radius of curvature and the center of curvature in the transverse plane.

Figure 4:
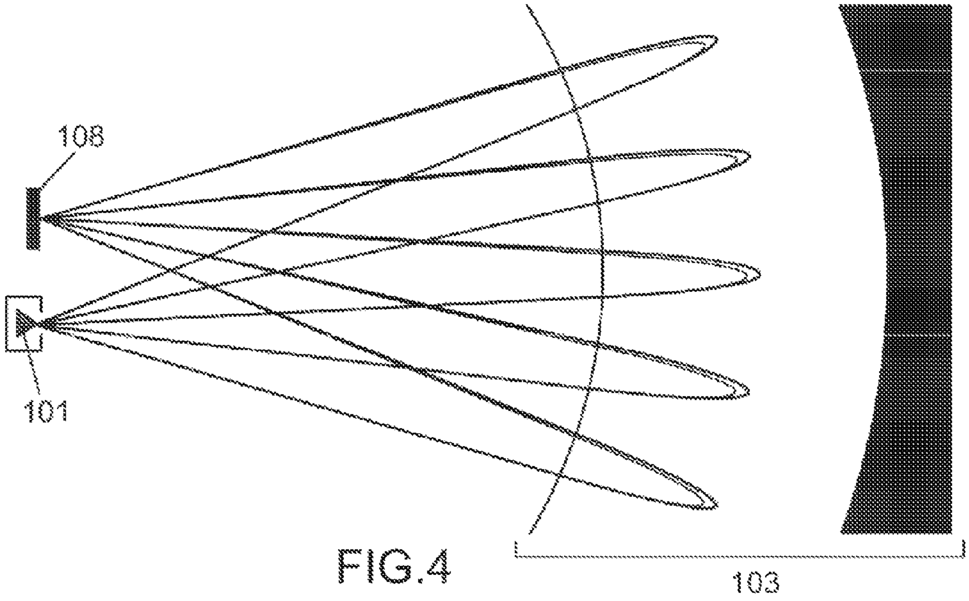
FIG. 4, the cross-sectional view in the radial plane of a mass analysis device, of an exemplary geometry of a reflectron with a detector placed at the focus point conjugate with the point at which the sample is situated, according to another embodiment of the present invention.

FIG. 4 shows the perspective view, of an exemplary geometry of a reflectron with a detector 108 placed at the level of the focus point conjugate with the point at which the sample 101 is situated, according to another embodiment of the present invention.

According to this embodiment, the intensity of the electrostatic field generated by the ion mirror 103 can be chosen so as to allow for a focus in terms of time of flight relative to the energy of the ions, at the level of the detector 108.

This particular embodiment may be advantageous if a spatial resolution of the ions is not necessary. This embodiment allows for a great mass resolution, for ions emitted from the surface of the sample 101 with a great angular dispersion. This characteristic can be obtained by placing the detector at a position coinciding with the focus point 111 in terms of time of flight relative to the energy of the ions.

More generally, it is possible to choose to position the detector 108 at a distance from the focus point 111 less than a given percentage of the radius of curvature of the rear electrode 107, for example 25%.

It is finally possible to envisage another embodiment of the invention, not represented in the figures. This embodiment is appropriate for applications in which the angular dispersion is great in a single plane. In such a configuration, the geometry of the reflectron can be simplified by using a gate electrode 106 and a rear electrode 107 with cylindrical surfaces.

It should finally be noted that, generally, and in itself known to those skilled in the art, the electrodes of the ion mirror 103 may be equipped with additional mechanical alignment means and/or additional sets of electrodes making it possible to adjust the form of the electrostatic field. It is also advantageous, for a better adjustment of the performance levels of the mass analyzer 100, to allow for a displacement of the detector 108 along the main axis of the analysis device 100 and/or of the sample 101 along all three axes. It may also be advantageous to provide the sample-holding mechanism with means for inclining the sample in order to correct sample and/or sample-holder inclination defects.

The invention claimed is:

1. A time-of-flight mass analysis device, notably of mass spectrometer or atom probe type, comprising:

means for receiving a sample, means for extracting ions from the surface of the sample, a detector, an ion mirror producing an electrostatic field whose equipotential lines are defined by a first curvature in a first direction contained in the radial plane of the mass analysis device and a first center of curvature, and a second curvature in a second direction perpendicular to the first direction in the transverse plane of the mass analysis device and a second center of curvature, the sample being positioned at a distance from the first center of curvature less than a quarter of the first radius of curvature.

2. The time-of-flight mass analysis device according to claim 1, wherein the detector is positioned at a distance from the spatial focal point of the ions emitted from the sample in the first direction, after reflection by the ion mirror, less than a quarter of the first radius of curvature.

3. The time-of-flight mass analysis device according to claim 1, wherein the detector is positioned downstream of the spatial focal point of the ions emitted from the sample in the first direction, after reflection by the ion mirror.

4. The time-of-flight mass analysis device according to claim 1, wherein the detector is sensitive to the two-dimensional position of the impact of the ions on its surface.

5. The time-of-flight mass analysis device according to claim 1, wherein the detector can be displaced along the main axis of the mass analysis device.

6. The time-of-flight mass analysis device according to claim 1, wherein the ion mirror comprises a rear electrode and a gate electrode, the electrostatic field being formed between the rear electrode and the gate electrode.

7. The time-of-flight mass analysis device according to claim 6, wherein the rear electrode and the gate electrode have a cylindrical surface.

8. The time-of-flight mass analysis device according to claim 6, wherein the rear electrode (107) and the gate electrode (106) have a spherical surface.

9. The time-of-flight mass analysis device according to claim 1, further comprising:

means that can vary the electrostatic field produced by the ion mirror.

10. The time-of-flight mass analysis device according to claim 1, wherein the sample can be displaced in all directions.

11. The time-of-flight mass analysis device according to claim 1, wherein the ion extraction means tear the ions from the surface of the sample by field desorption.

12. The time-of-flight mass analysis device according to claim 1, wherein the sample can be pivoted.

13. The time-of-flight mass analysis device according to claim 1, wherein the ion extraction means tear the ions from the surface of the sample by laser desorption.

14. The time-of-flight mass analysis device according to claim 1, wherein the ion extraction means tear the ions from the surface of the sample by secondary ion emission.

* * * * *